United States Patent [19]

Fradenburgh

[11] 4,248,572
[45] Feb. 3, 1981

[54] HELICOPTER BLADE

[75] Inventor: Evan A. Fradenburgh, Fairfield, Conn.

[73] Assignee: United Technologies Corp., Hartford, Conn.

[21] Appl. No.: 968,595

[22] Filed: Dec. 11, 1978

[51] Int. Cl.³ .............................................. B64C 27/46
[52] U.S. Cl. .................................... 416/228; 416/242
[58] Field of Search ..................... 416/228, 237, 242

[56] References Cited

U.S. PATENT DOCUMENTS

| 3,065,933 | 11/1962 | Williams | 416/242 |
| 3,399,731 | 9/1968 | Giles | 416/237 |
| 3,558,081 | 1/1971 | Williams | 416/242 |
| 3,721,507 | 3/1973 | Monteleone | 416/228 A |
| 3,728,045 | 4/1973 | Balch | 416/228 |
| 3,822,105 | 7/1974 | Jepson | 416/228 |
| 3,902,821 | 9/1975 | Robinson | 416/242 |
| 4,077,741 | 3/1978 | Lowson et al. | 416/237 |
| 4,130,377 | 12/1978 | Blackwell, Jr. | 416/228 |
| 4,142,837 | 3/1979 | de Simone | 416/226 |

Primary Examiner—Everette A. Powell, Jr.
Assistant Examiner—A. N. Trausch, III
Attorney, Agent, or Firm—Vernon F. Hauschild

[57] ABSTRACT

A cambered helicopter blade having a swept and tapered tip, and having linear twist throughout the outer 70 percent of the blade span and nonlinear twist inboard thereof.

10 Claims, 22 Drawing Figures

SWEPT & TAPERED
TIP (S-76)

TAPERED TIP
(TAPER RATIO SAME
AS S-76 TIP)

SWEPT TIP
(CONSTANT CHORD)

RECTANGULAR TIP

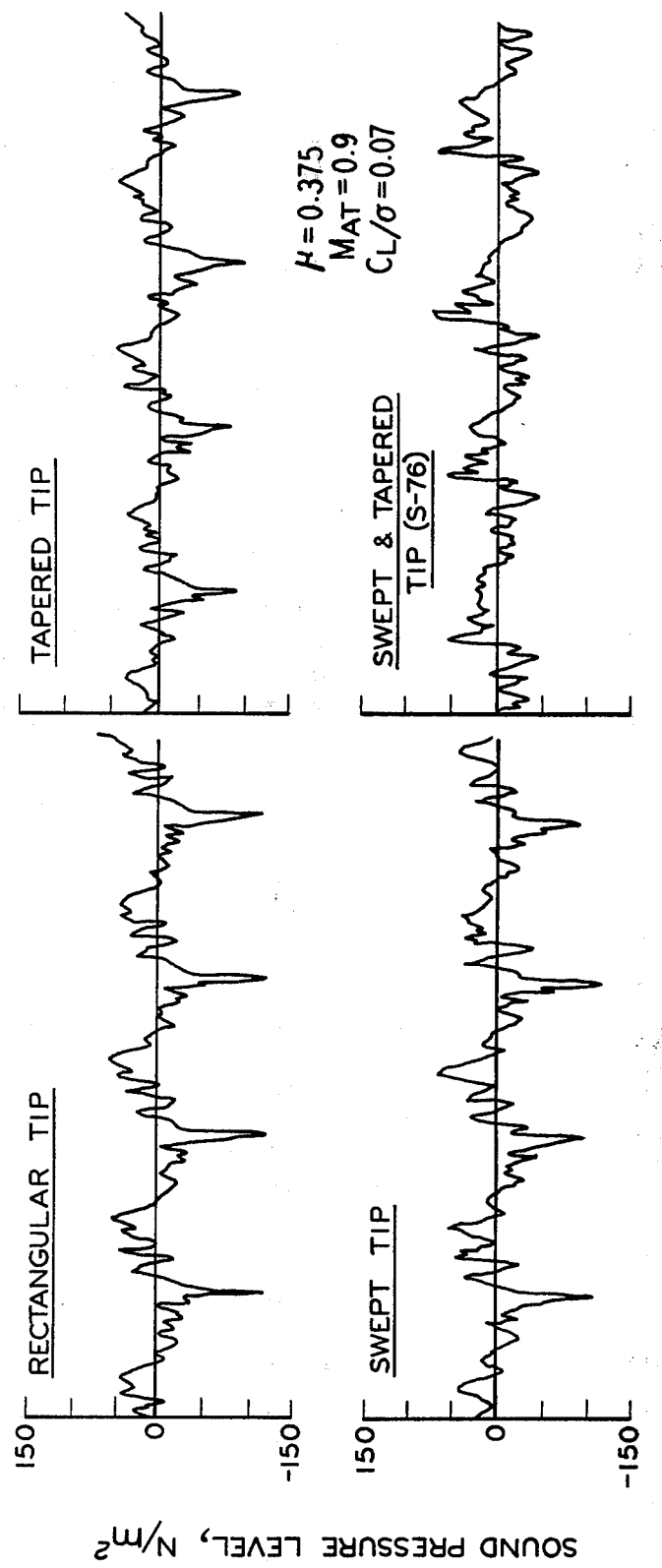

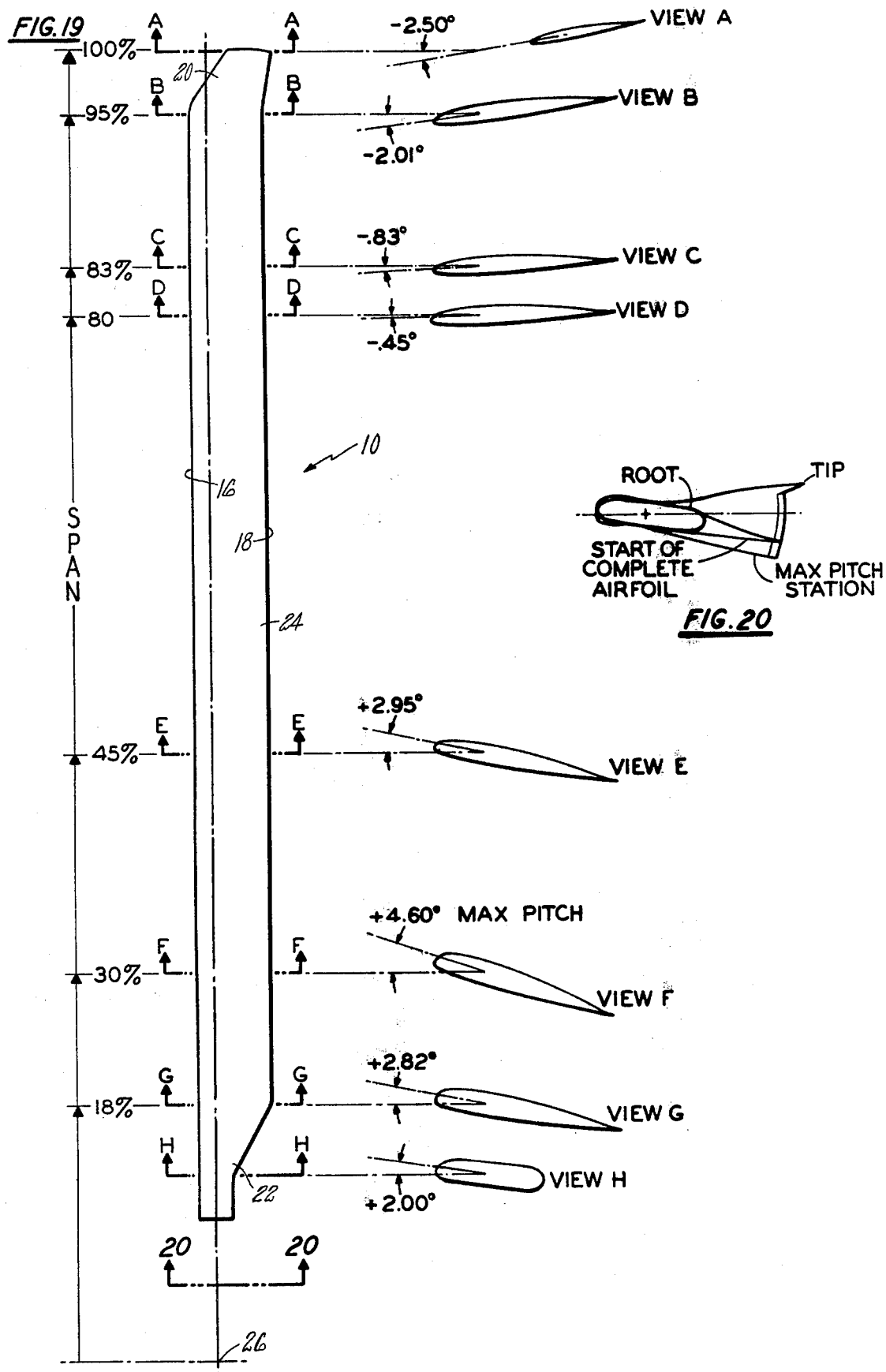

HELICOPTER BLADE

BACKGROUND OF THE INVENTION

1. Field of Invention

This invention relates to helicopter blades and more particularly to helicopter blades of the type intended to be used in high speed flight commercial helicopters which will take off and land much of the time in ground-effect mode and including a selectively shaped tip and selected twist to accommodate this mode and other normal helicopter operating modes in improved fashion.

2. Description of the Prior Art

Swept tips are known in the helipcopter blade art, for example, in Giles U.S. Pat. No. 3,399,731, Jepson U.S. Pat. No. 3,822,105 and Monteleone U.S. Pat. No. 3,721,507, but none of this prior art has the selectively-shaped tip, twist and camber as the improved blade taught herein. For example, Giles has neither twist nor camber and Monteleone is basically a 20° swept tip without taper. Further, the tip of the Giles blade ends in a plane perpendicular to the swept or tip axis and his swept tip airfoil cross sections are also perpendicular to the swept axis, producing very low Reynolds Numbers because of the small tip chord parallel to the wind, resulting in high drag coefficients. The tip of my blade, and its airfoil cross section, are perpendicular to the blade span axis.

While other prior art patents such as the aforementioned Jepson and Monteleone patents, and Balch U.S. Pat. No. 3,728,045 teach selectively-shaped helicopter blades, there is no known prior art teaching an improved blade of the type taught herein having the selectively-shaped tip, twist and other features described in greater particularity hereinafter to achieve the advantages which will be described.

SUMMARY OF THE INVENTION

A primary object of the present invention is to teach an improved helicopter blade having swept tip to place the tip aerodynamic center behind the tip feathering axis so that the positive lift experienced by the tip in hover will twist the blade nose-down, and so that the download experienced by the advancing blade tip at high speed flight will twist the blade nose-up so that, in each instance, improved load distribution across the entire span of the blade is experienced and so that drag on the blade is reduced.

In accordance with a further aspect of this invention the blade tip is selectively tapered to reduce the overall tip area and thus the amount of tip upforce in hover and advancing blade tip downforce and the drag due to Mach number effects in forward speed over the advancing blade to thereby more selectively distribute the load over the entire blade span.

It is still a further object of this invention to teach such a helicopter blade in which the blade tip taper ratio is about 0.6, and in which the tip centroid is off-set a selected distance rearwardly of the blade feathering axis, which is also the blade twist axis and the one-quarter blade chord line in this blade, so that the blade tip quarter chord has approximately a 30° sweep, so that the blade leading edge has approximately a 35° sweep, and so that the blade trailing edge has approximately a 10° sweep.

It is still a further object of this invention to utilize selective linear twist in the helicopter blade to obtain the effect and advantage of nonlinear twist without its manufacturing disadvantages, wherein the blade is of $-10°$ linear twist rate throughout the outer 70 percent of the blade span, and of reducing nonlinear twist inboard thereof, wherein the twist at the blade tip, measured relative to the 75 percent span or radius station, is approximately $-2\frac{1}{2}°$, the twist at the blade 30 percent radius station is approximately $+4.5°$, and then reduces non-linearly inboard thereof to about $+2°$ inboard at the blade root.

It is still a further object of this invention to teach such a helicopter blade in which selectively shaped airfoil sections are utilized at different stations along the blade span to effect optimum performance.

It is still a further feature of this invention to teach such an improved helicopter blade which utilizes reflex trailing edge tabs to bring the pitching moment of the blade airfoil sections to substantially zero, and which has an elliptically faired trailing edge at the blade root portion to reduce blade drag, especially in the forward flight mode.

Other objects and advantages of the present invention may be seen by referring to the following description and claims, read in conjunction with the accompanying drawings.

BRIEF DESCRIPTION OF THE DRAWINGS

FIG. 5 plot of the blade twist relative to 75 percent radius in degrees is plotted against the radius or span stations along the span of the blade.

FIG. 12 is a graph of the ratio of the power coefficient to solidity ratio of the blade under test divided by that ratio for the conventional rectangular tip plotted against advanced ratio. Advance ratio is the ratio of the forward flight speed of the helicopter to the tip speed due to rotation of the rotor.

FIG. 16 is an accoustic comparison of the four blade tips under test.

FIG. 19 is a diagrammatic plan view of my improved helicopter blade with blade cross-sectional views taken along the blade span at the points of important blade dimensional and shape changes.

FIG. 20 is an enlarged diagrammatic showing taken along section line 20—20 of FIG. 19.

DESCRIPTION OF THE PREFERRED EMBODIMENT

To best understand the significance of the construction of my improved helicopter blade, it is deemed advisable to first explain some of the theory behind the blade design.

It is accepted practice in the helicopter field to use swept tips on helicopter blades so as to place the blade aerodynamic center behind the blade feathering axis. The reason for this is that when a positive lift is experienced by the tip in hover the result is to twist the blade nose-down so as to increase the amount of blade twist and thereby obtain better lift distribution over the full span of the blade so as to reduce the power required to drive the blade and rotor. Further, the advancing blade tip in forward high speed flight may experience a download, which creates drag. The swept tip compensates for this by twisting the blade in a nose-up direction, which alleviates the download and thereby tends to improve the load distribution across the span of the blade to reduce the power required to drive the blade. Accordingly, in high-speed forward flight, for every revolution of the blade about the rotor axis of rotation, the swept tip causes a twisting nose-up action on the advancing side and a nose-down action on the retreating side.

Figure 1:
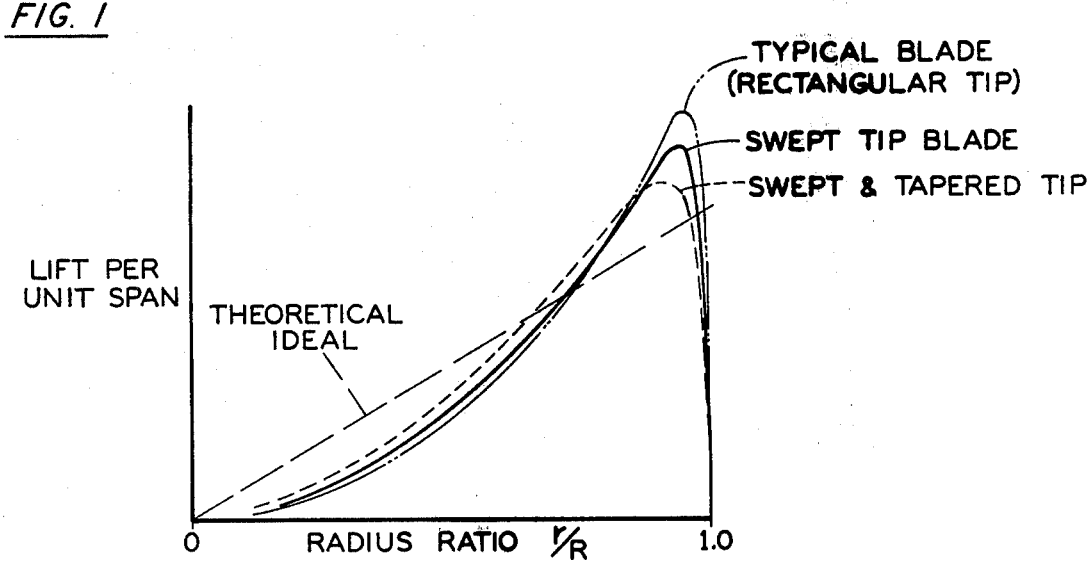
FIG. 1 is a graph of lift plotted against span or radial station to illustrate the lift or work generated by comparative blades at various stations along the span or radius when the helicopter is operating in hover.
Figure 2:
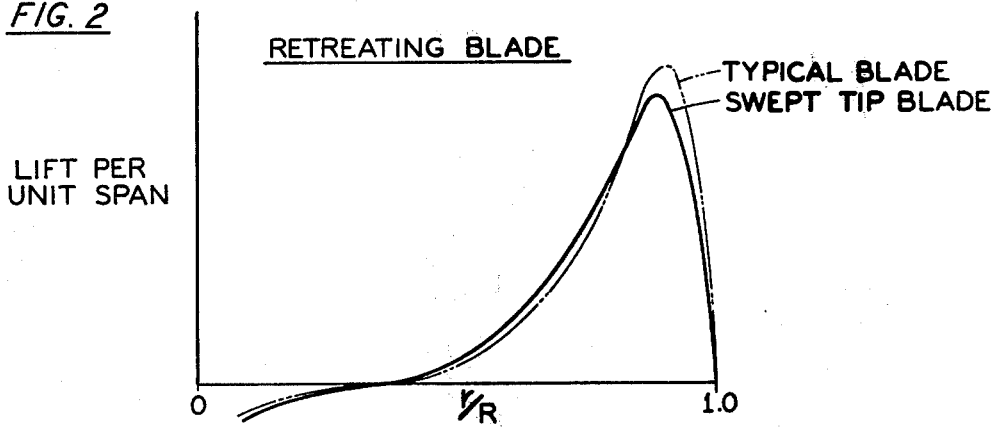
FIG. 2 is similar to FIG. 1 except the graph illustrated is for comparison purposes with respect to the helicopter retreating blade operating in forward flight.
Figure 3:
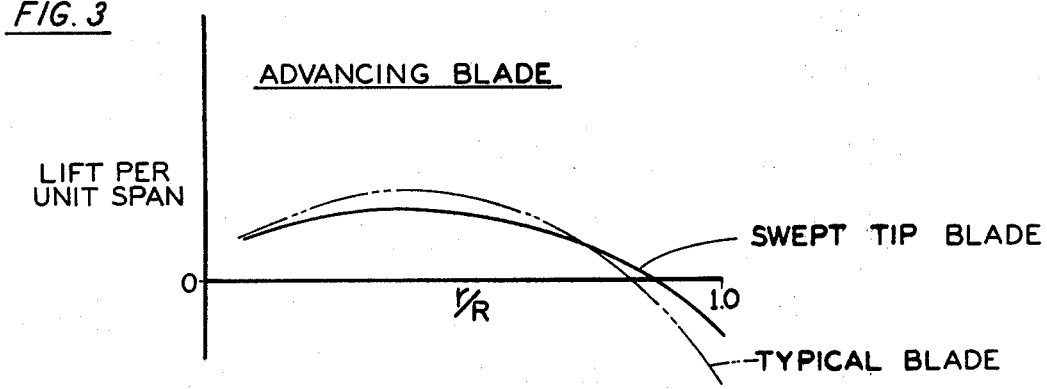
FIG. 3 is comparable to FIGS. 1 and 2 but shows a comparison of the blades tested with respect to the advancing blade in forward flight.

The effect of a swept tip blade is best understood by viewing FIGS. 1 through 3, which show the lift generated by the blade at various span or radial positions along the blade. FIG. 1 shows that in the hover operation, a very substantial lift is produced by the typical blade with rectangular tip above the theoretical ideal. FIG. 1 demonstrates that the effect of the greater twist produced by the swept tip brings the lift distribution somewhat closer to the theoretical ideal, thereby reducing power for a given total lift. FIG. 2 shows that for a retreating blade in high-speed forward flight, increased twist brought about by the swept tip causes a reduction in the peak loading near the tip, thereby alleviating the blade stall which tends to occur near the retreating blade tip at high flight speeds. FIG. 3 illustrates that for the advancing blade in high-speed forward flight, the reduced twist brought about by the swept tip produces a more uniform load distribution across the span of the blade and definitely reduces the download felt by the blade tip in the typical helicopter blade.

It is a further teaching of my improved blade that the blade tip, not only be swept but also be tapered to reduce the overall area of the tip and therefore the amount of upforce and downforce which the tip feels, and which produces twisting or change of pitch throughout the remainder of the blade span. This swept but tapered tip is particularly significant in hover and it will be noted by viewing FIG. 1 that the "swept and tapered tip" line shows reduced lift at the blade tip due to its lesser area and increased lift at radius ratio stations inboard thereof over the typical or conventional blade and the swept tip blade for the same total lift, so as to be closer to the theoretical ideal.

A further advantage of the reduced area brought about by the swept and tapered tip occurs at the advancing blade tip. The advancing tip which experiences very high dynamic pressures and Mach numbers in the high-speed flight regime, produces very high drag which increases the power consumption of the rotor. The reduced area of the swept-tapered tip reduces this drag and contributes to improved rotor efficiency.

Figure 4:
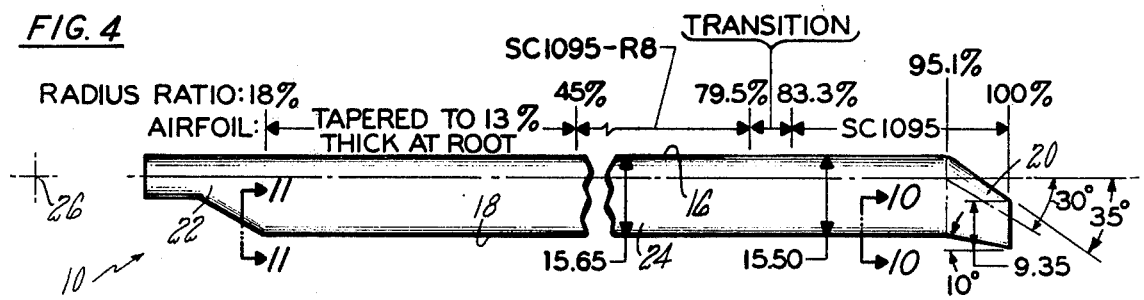
FIG. 4 is a plan view of my improved helicopter blade.

In deciding the preferred sweep angle and taper in the tip of my improved blade which is shown in FIG. 4 in greater particularity, our experience showed that we had the physical limitation of starting the blade tip at about 95 percent blade radius or span because tip load support problems would be encountered if we extended the tip further inboard thereof. Following much analytical work and testing as described hereinafter, I selected a blade with a 35° sweep in its leading edge and a 10° sweep in its trailing edge so as to give a tip taper ratio of approximately 0.6. The taper ratio of the tip is the extreme tip chord dimension divided by the tip root chord dimension. A tip taper ratio is about 0.6 is known to be close to the theoretical ideal for the operating conditions of interest.

Further, based upon our very good experience with the 20° swept tip of the Sikorsky UH-60A BLACK HAWK helicopter, I also wanted the blade tip to be shaped so that the aerodynamic center of the blade tip is offset a selected distance rearwardly from the blade feathering axis, which is also the one-quarter chord station in this blade, so that the product of this offset times the tip area, expressed in dimensionless terms, equals the same product for those parameters of the very successful BLACK HAWK 20° swept tip disclosed in Monteleone U.S. Pat. No. 3,721,507. To compensate for reduced tip area the sweep of the quarter chord was increased since the aerodynamic center is located approximately on the quarter-chord line at the span station corresponding to the centroid of the tip area. This caused our swept, tapered tip aerodynamic center to be offset from the feathering and twist axis by an amount equal to approximately 22 percent of the tip root chord dimension so as to produce this parameter product equalization with the BLACK HAWK. This occurred when the tip quarter chord, forms an approximate 30° sweep with the blade feathering axis, which is also the twist axis and at quarter chord. My swept-tapered tip configuration is selectively contoured to combine the potential individual benefits of tapered and swept configurations while maintaining the same degree of compliancy as the purely swept tip blade of the BLACK HAWK helicopter.

This feature of my blade is described in greater particularity in the Rabbott and Niebanck publication fully identified hereinafter.

Figure 5:
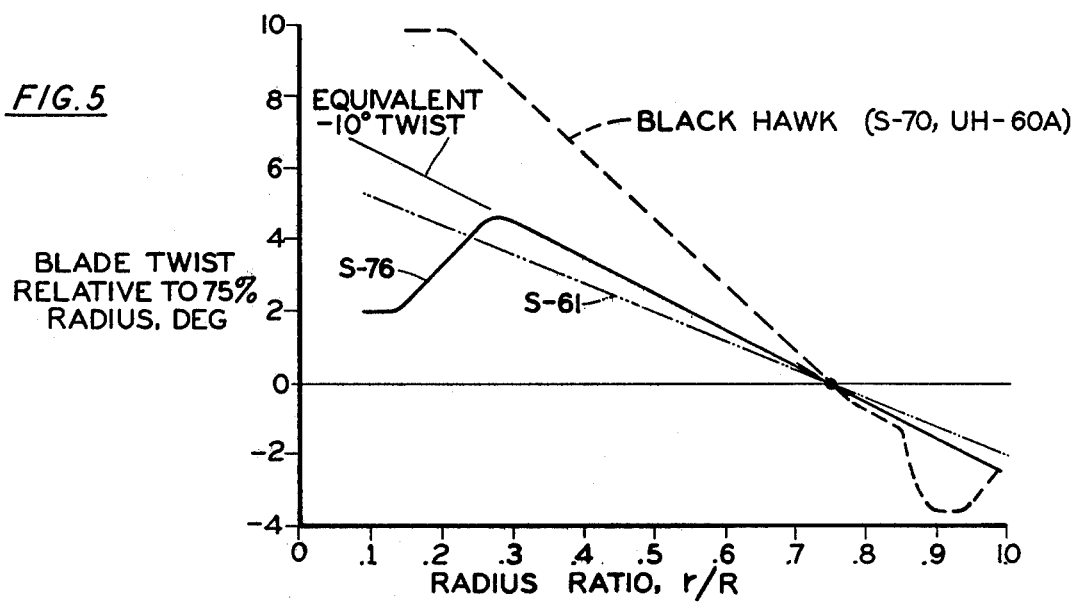
FIG. 5 is a graph demonstrating the twist of the typical or conventional helicopter designated as S-61, the nonlinear twist BLACK HAWK helicopter, and the twist of my improved blade for the S-76 helicopter.
Figure 6:
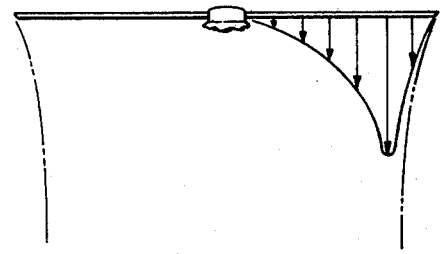
FIG. 6 is an illustration of the downwash of a helicopter rotor when not in ground-effect mode.
Figure 7:
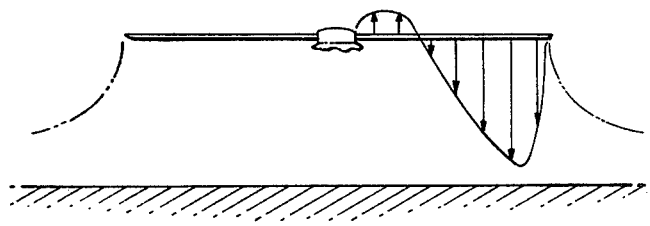
FIG. 7 corresponds to FIG. 6 but with the helicopter in ground-effect mode of operation.

The twist of my improved helicopter blade will now be described by first referring to FIG. 5, which is a plot of the twist of the typical a conventional Sikorsky Aircraft helicopter blade identified as S-61, against the nonlinear twist of the S-70 BLACK HAWK blade, and the selected twist of my improved blade identified by curve S-76. By referring to FIG. 5 it will be noted by viewing the curve identified as S-61, that the typical or conventional Sikorsky Aircraft helicoter blade is said to have 8° linear negative twist. This is actually a left-hand twist when viewed from either end and which we call "negative twist". Most earlier Sikorsky helicopters include blades of this twist. The nonlinear twist BLACK HAWK blade shown in FIG. 5 represents one of the rare deviations by Sikorsky Aircraft from linear twist. It will be noted that the BLACK HAWK tip has substantial nonlinearity. It is the objective of my improved blade to obtain the advantages of the BLACK HAWK nonlinear twist without the manufacturing difficulties thereof, by producing a tapered and swept tip used on a blade of selected twist. By viewing the FIG. 5 graph designated S-76 it will be noted that my improved blade throughout the outer 70 percent radius or blade span has a $-10°$ equivalent linear twist and then reduces in twist at the blade root section. In fact, our preferred S-76 blade has $-2\frac{1}{2}°$ twist (relative to the standard aerodynamic reference station at 75 percent radius) at the blade extreme tip, and is linear inboard thereof to the $+4.5°$ twist at the 30 percent span or radius station, and then reduces to $+2°$ inboard thereof at the blade root. We have utilized this type of twist at the blade root for two reasons. The first reason for reduced pitch or twist at the blade root is to minimize the download in the reverse velocity region of the retreating blade in high forward flight speeds. The high pitch of the blade due to twist adds to the already high pitch of the blade due to collective and cyclic pitch control inputs and results in extremely high pitch angles at the root of the retreating blade. Since the airflow is coming from the trailing edge and proceeding toward the blade leading edge in this reverse velocity region at high forward flight speeds, this high pitch results in a download and high drag, both of which are undesirable from a performance standpoint. In the S-76 blade, by reducing the blade pitch with twist reversal at the root end, the down-load and consequent drag penalties on the retreating blade are minimized. The second reason for using this particular twist in my improved blade root has to do with the fact that my blade is intended for use on a commerical helicopter which will operate in hover mode in ground-effect for most take-off and landing operations. By ground-effect we mean that the rotor downwash is being affected by the fact that the helicopter is operating close to the ground. The effect of ground-effect is to produce an upflow of air at the center of the rotor, precisely the opposite of what occurs when the helicopter is not in ground-effect. This ground-effect result will best be appreciated by viewing FIGS. 6 and 7. FIG. 6 is a showing of the downwash velocity profile from the helicopter rotor when hovering out of ground effect, that is when operating at an altitude at least several rotor diameters above the ground, and it will be noted therefrom that all airflow is in a downward direction. FIG. 7 illustrates the same helicopter in ground-effect mode and it will be noted that at the inboard end of the blade, reverse flow occurs upwardly through the rotor, and therefore an upflow is experienced at the root end of the blade in ground-effect. This effect is more fully explained in my paper entitled "Flow Field Measurements of a Hovering Rotor Near the Ground" presented at the American Helicopter Society Fifth Annual Western Forum at Los Angeles, Calif. on Sept. 25–26, 1958 and published by the American Helicopter Society. When the conventional helicopter blade with a normally high twist operates in this upflow regime in hover-in-ground-effect mode of operation, this reverse airflow angle of the attack on this very high pitch root section puts the root section into stall condition, thereby causing loss of lift capability and producing drag which increases the power required. My blade overcomes this problem by reducing the blade twist so as to keep the air angle of attack on the blade root out of stall so that the blade root continues to generate lift and avoid the high drag associated with stall.

Describing the twist of my improved S-76 blade in words rather than graphically, in conventional fashion, I shall reference the twist to the 75 percent radius point which is conventional practice among aerodynamacists. With this reference, the actual twist is $-2\frac{1}{2}°$ at the tip and $+4.5°$ at the 30 percent radius station or span. The twist is reduced inboard of the 30 percent radius station or span in a moderately easily manufactured curve to an actual pitch of $+2°$ at the blade root. Between the 30 percent radius station and the tip, the twist is linear with a rate of $-10°$, that is, the total twist of the blade would be $-10°$ if this rate extended from the tip into the rotor center of rotation.

Figure 8:
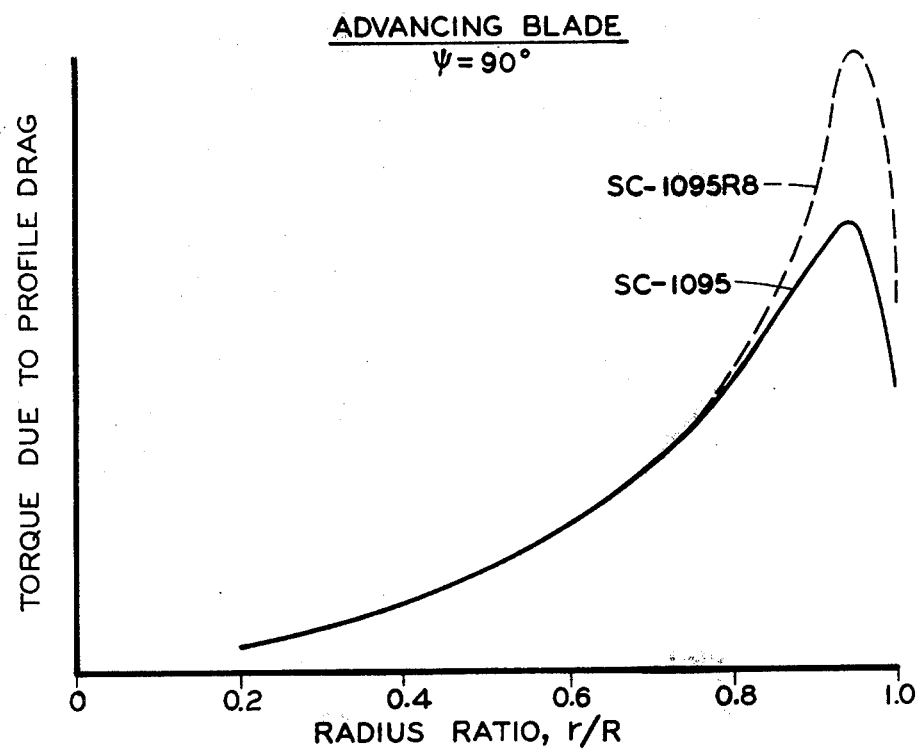
FIG. 8 is a graph of the comparative performance of an SC1095-R8 and an SC1095-R8 blade for the advancing blade over the full blade span.
Figure 9:
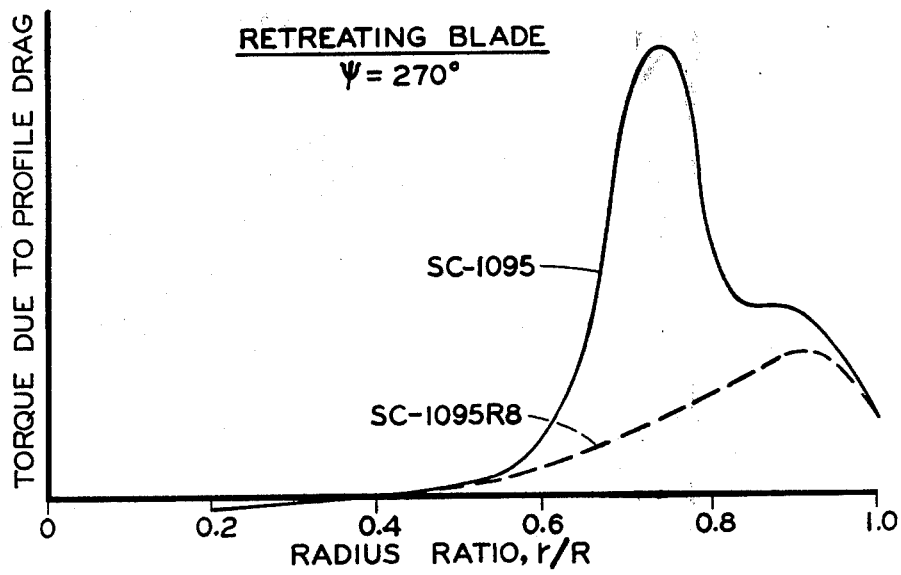
FIG. 9 corresponds to FIG. 8 but relates to the retreating blade.

As best shown in FIG. 4, my improved blade is of cross-sectional shape known as SC1095 between the blade tip and approximately the blade 83 percent radius or span station and of cross-sectional shape SC1095-R8 between approximately the blade 80 percent radius or span station and the 45 percent radius or span station. The blade tapers from 9.5 percent thickness to 13 percent thickness from the 45 percent to the 18 percent radius or span station. These particular airfoil cross sections were selected because of their known performance capability and were positioned as shown in FIG. 4 spanwise because, as best shown in FIGS. 8 and 9 the advancing blade of SC1095 cross section produces less profile drag in the blade tip area and the retreating blade of SC1095-R8 cross section produces less profile drag at the inboard stations of the retreating blade. Reference is hereby made to my American Helicopter Society paper, Preprint No. 78-06, more fully identified hereinafter, for further details and explanation concerning this blade.

FIGS. 19 and 20 show the shape of my improved blade 10 in greater particularly. Viewing FIG. 19, section A—A is the blade tip or 100 percent blade span station or radius ratio, since the blade span extends from center of rotation of the rotor 26 to the blade tip. It will be noted from view A that the blade pitch at the blade tip is approximately $-2.50°$ negative. As in the earlier part of this specification, all pitch dimensions shown in FIG. 19 are pitch relative to the blade pitch at the 75 percent span station. Section B—B is the station at which tip taper commences at approximately 95 percent span station and it will be noted that the relative pitch as shown in View B is $-2.01°$. Station C—C is at approximately the 83 percent span station and is the inboard limit of the SC1095 airfoil section, whose outboard limit is at station B—B. It will be noted that the relative pitch of the blade at station C—C is $-0.83°$, as shown in View C. Blade 10 is of constant airfoil SC1095 between stations B—B and C—C. Station D—D represents the inboard end of the transition section between stations C—C and D—D. Station D—D also represents the outboard limit of the blade SC1095-R8 airfoil. View D shows that the relative blade pitch at station D—D is $-0.45°$. My blade is of constant airfoil between stations D—D and E—E, namely airfoil SC1095-R8, with station E—E representing the inboard end of that constant airfoil section at approximately the blade 45 percent span station. It will be noted by viewing View E that the relative blade pitch at station E—E is $+2.95°$. Station F—F which is at the span station approximately 30 percent station is the station of maximum pitch, $+4.60°$ as shown in View F. Station F—F is the point of pitch reversal of the blade so that the blade has a substantially $-10°$ linear twist outboard of station F—F and reverses to nonlinear, positive twist inboard thereof. Station G—G is the span station representing the start of complete airfoil shape and is approximately the 18 percent span station. It will be noted by viewing View G that the blade relative pitch at station G—G is $2.82°$ positive pitch. My blade airfoil thickness is of increasing taper between stations E—E and G—G. Station H—H represents the blade root. It will be noted by viewing View H that the relative pitch at station H—H is positive $2.00°$.

Viewing FIG. 20 we see my blade 10 as viewed from section line 20—20 of FIG. 19, but in enlarged view. FIG. 20 has had words added thereto to indicate the blade root which corresponds to section H—H of FIG. 19, the blade tip which corresponds to section A—A of FIG. 19, the blade maximum pitch station which corresponds to station F—F of FIG. 19, and the start of the complete airfoil which corresponds to section G—G of FIG. 19

Full details concerning the precise shape of the central portion of my blade identified as the SC1095 airfoil excluding the trailing edge tab, may be found in U.S. Pat. No. 3,728,045 to Balch, which is hereby incorporated by reference. It will be noted that the Balch Patent includes both formula and coordinate definitions of the SC1095 cross-sectional shape and other data and parameters relative thereto.

The SC1095 airfoil cross section is also defined by the coordinate system:

| X/C | $Y_u$/C | $Y_L$/C |
|---|---|---|
| 0.00 | 0.00 | .00 |
| 0.0125 | 0.0177 | −.0145 |
| 0.025 | 0.0264 | −.0210 |
| 0.05 | 0.03677 | −.02843 |
| 0.075 | 0.04275 | −.03225 |
| 0.10 | 0.0468 | −.03460 |
| 0.15 | 0.0517 | −.0374 |
| 0.20 | 0.05447 | −.03883 |
| 0.25 | 0.0555 | −0.0394 |
| 0.30 | 0.05524 | −.03916 |
| 0.40 | 0.05299 | −.03761 |
| 0.50 | 0.04854 | −.03446 |
| 0.60 | 0.04212 | −.02988 |
| 0.70 | 0.03375 | −.02384 |
| 0.80 | 0.02362 | −.01658 |
| 0.90 | 0.01235 | −.00864 |
| 0.975 | 0.00328 | −.00232 |
| 1.0 | 0.00 | .00 |

Where X is the station along the blade chord, C is the blade chord dimension, Y is the location of the upper airfoil surface at station X, and $Y_L$ is the location of the lower airfoil surface at station X, and wherein the leading edge radius of the upper airfoil is 0.010 taken from a point on the blade chord and wherein the leading edge radius of the lower airfoil is 0.0066 taken from a point on the blade chord and within a range of ±3 percent of the given values of $Y_u$/C and $Y_L$/C so determined.

Further, full particulars including formula and coordinate definition of the section of the central portion of my blade identified as being of cross-sectional shape SC1095-R8 are contained in U.S. patent application Ser. No. 850,765, filed on Nov. 11, 1977 on an improved Helicopter Blade by Gary J. De Simone, which is hereby incorporated by reference. The SC1095-R8 airfoil cross section is defined by the coordinate system:

| UPPER SURFACE | | LOWER SURFACE | |
|---|---|---|---|
| $\frac{X}{C}$ | $\left(\frac{Y}{C}\right)_u$ | $\frac{X}{C}$ | $\left(\frac{Y}{C}\right)_L$ |
| 0.0 | 0.0 | 0.0 | 0.0 |
| .0125 | .0251149 | .0125 | −.0158497 |
| .025 | .0359152 | .025 | −.0187780 |
| .05 | .0495495 | .05 | −.0215250 |
| .075 | .0559500 | .075 | −.0227219 |
| .10 | .0602962 | .10 | −.0234926 |
| .15 | .0652657 | .15 | −.0245243 |
| .20 | .0673344 | .20 | −.0254468 |
| .25 | .0676587 | .25 | −.0263019 |
| .30 | .0668161 | .30 | −.0269408 |
| .40 | .0628376 | .40 | −.0270691 |
| .50 | .0568882 | .50 | −.0257689 |
| .60 | .0489283 | .60 | −.0230331 |
| .70 | .0388951 | .70 | −.0185521 |
| .80 | .0271559 | .80 | −.0130986 |
| .90 | .0140638 | .90 | −.0069779 |
| .975 | .00358462 | .975 | −.00185432 |
| 1.0 | 0.0 | 1.0 | 0.0 |

Where capital X is the station along the blade chord, C is the blade chord dimension, (Y/C)u is the location of the upper airfoil surface, and $(Y/C)_L$ is the location of the lower airfoil surface.

Figure 10:
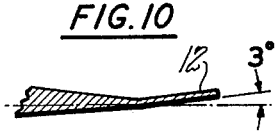
FIG. 10 is a showing taken along line 10—10 of FIG. 4.
Figure 11:
FIG. 11 is a showing taken along line 11—11 of FIG. 4.

As best shown in FIG. 10 my blade trailing edge has a deflected tab 12 shaped to be deflected in an up direction about 3°. The purpose of trailing edge tab 12 is to reduce the normal nose-down pitching moment produced by the SC1095-R8 and SC1095 blade cross sections to approximately zero pitching moment. This pitching moment is an aerodynamic moment created about the quarter-chord station of the blade airfoil. These nose-down pitching moments are undesirable because they produce a one per rev twisting effect upon the blade resulting in maximum nose-down pitch where the blade velocity is highest, that is the advancing blade, and tend to be in the opposite direction from the twist desired. A zero moment on the airfoil also minimizes control loads. Another feature of my improved helicopter blade is shown in FIG. 11 in the form of elliptical fairing 14 at the blade root. The reason for this elliptical fairing at the blade root is that in the high speed forward flight regime in which we have the above-described reverse flow relative to the retreating blade, this elliptical shape trailing edge will produce drag reduction. The practice in the prior art is for such trailing edges to be square and this prior art construction produces more drag in both the advancing and the retreating blade than the elliptical trailing edge 14 taught herein.

Referring to FIG 4, it will be seen that my improved blade 10 comprises a leading edge 16 and a trailing edge 18, a tip portion 20, a root portion 22, and a central portion 24 extending therebetween. Blade 10, in conventional fashion, is mounted with one or more additional blades to a helicopter hub for rotation about axis of rotation 26.

The particular helicopter blade tip section disclosed herein has been extensively tested in comparison to the typical rectangular tip, an upswept tapered tip having the similar taper ratio of 0.6, a swept constant-chord tip of the type disclosed in Monteleone U.S. Pat. No. 3,721,507, having a 20° sweep, and the particular blade of this application identified in the published reports on these tests as the "swept trapezoidal" or "swept-tapered" tip. Some of the details of the blade described in this application and the test results of the comparative testing of the aforementioned blade tips are included in the following publications of the American Helicopter Society of Washington, D.C.:

"Aerodynamic Design of the Sikorsky S-76 Helicopter" by Evan A. Fradenbergh of Sikorsky Aircraft Division, United Technologies Corporation, presented at the 34th Annual National Forum of the American Helicopter Society, May, 1978. (Preprint No. 78-06)

"Full-Scale Wind Tunnel Test of a Modern Helicopter Main Rotor-Investigation of Tip Mach Number Effects and Comparisons of Four Tip Shapes" by Robert H. Stroub, Ames Research Center, NASA and Aeromechanics Laboratory, U.S. Army R&T Laboratories, Ames Research Center, Moffet Field, Calif., presented at the 34th Annual National Forum of the American Helicopter Society, May, 1978 (Preprint No. 78-03A); and "Experimental Effects of Tip Shape on Rotor Control Loads" by John P. Rabbott, Jr., Aeromechanics Laboratory, U.S. Army R&T Laboratories, Ames Research Center, Moffett Field, Calif. and Charles Niebanck, Sikorsky Aircraft Division, United Technologies Corporation, presented at the 34th Annual National Forum of the American Helicopter Society, May 1978 (Preprint No. 78-61-7).

Figure 12:
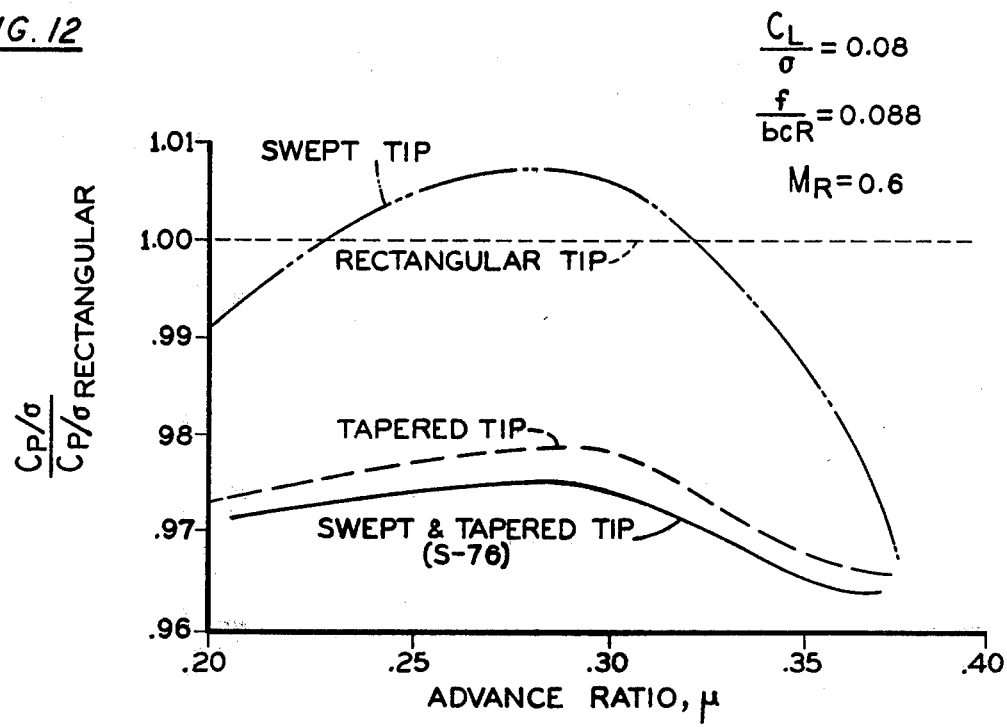
FIG. 12 is a graph comparing against the typical helicopter blade the performance of particular blade tips including the tip used on the improved blade of this to show the advantage of my blade tip over other typical and conventional blade tips with respect to the power required to drive the blade tip at conventional commercial helicopter operating conditions for lift coefficient-to-solidity ratio ($C_L/\sigma$) of 0.08, for ratio of flat plate area-to-total blade area ($f/bcR$) of 0.088, and for Mach number based on rotating tip speed (MΩR) of 0.6.

FIG. 12 is taken from the aforementioned Stroub report and is a plot of the power required to drive the rotor with these particular FIG. 19 tips as it would be driven on a helicopter under lift conditions, propulsive force conditions, and tip speed conditions which are typical for modern commercial helicopters. FIG. 12 demonstrates that my tip, identified thereon as the "swept and tapered tip (S-76)", is superior throughout the entire range to the other blades tested, requiring the least power.

Figure 13:
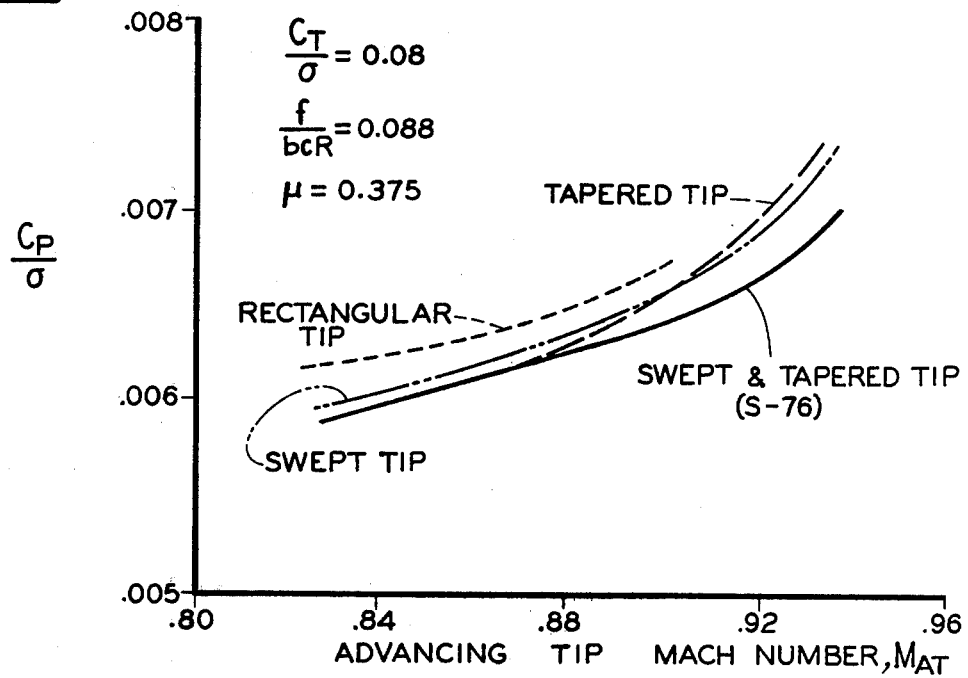
FIG. 13 is a graph of my improved blade tip tested in comparison to other known tips and constitutes a plot of power coefficient to solidity ratio plotted against advancing blade Mach number to illustrate the power required to drive the blade tips as a function of Mach number for the parameter values illustrated thereon, namely, lift coefficient-to-solidity ratio of 0.08, ratio of flat plate area-to-total blade area of 0.088, and advance ratio (or ratio of forward speed to tip speed) ($\mu$) of 0.375.

FIG. 13 is also from the aforementioned Stroub report and demonstrates the superiority throughout the range tested of my improved tip identified as "swept and tapered tip (S-76)" when tested in comparison to the other three blade tips for typical lift, propulsive force and high speed advance ratio conditions to determine the power required to drive the blade as a function of the Mach number condition on the advancing tip. High Mach numbers can result either from operating at high tip speeds or at very cold temperatures which reduce the speed of sound. FIG. 13 shows that for high Mach numbers at the tip caused by high rotational and forward speeds, my swept and tapered tip is the least affected by Mach number. FIG. 13 illustrates that it performed in a superior fashion to the other three blades tested over the plotted Mach number regime.

Figure 14:
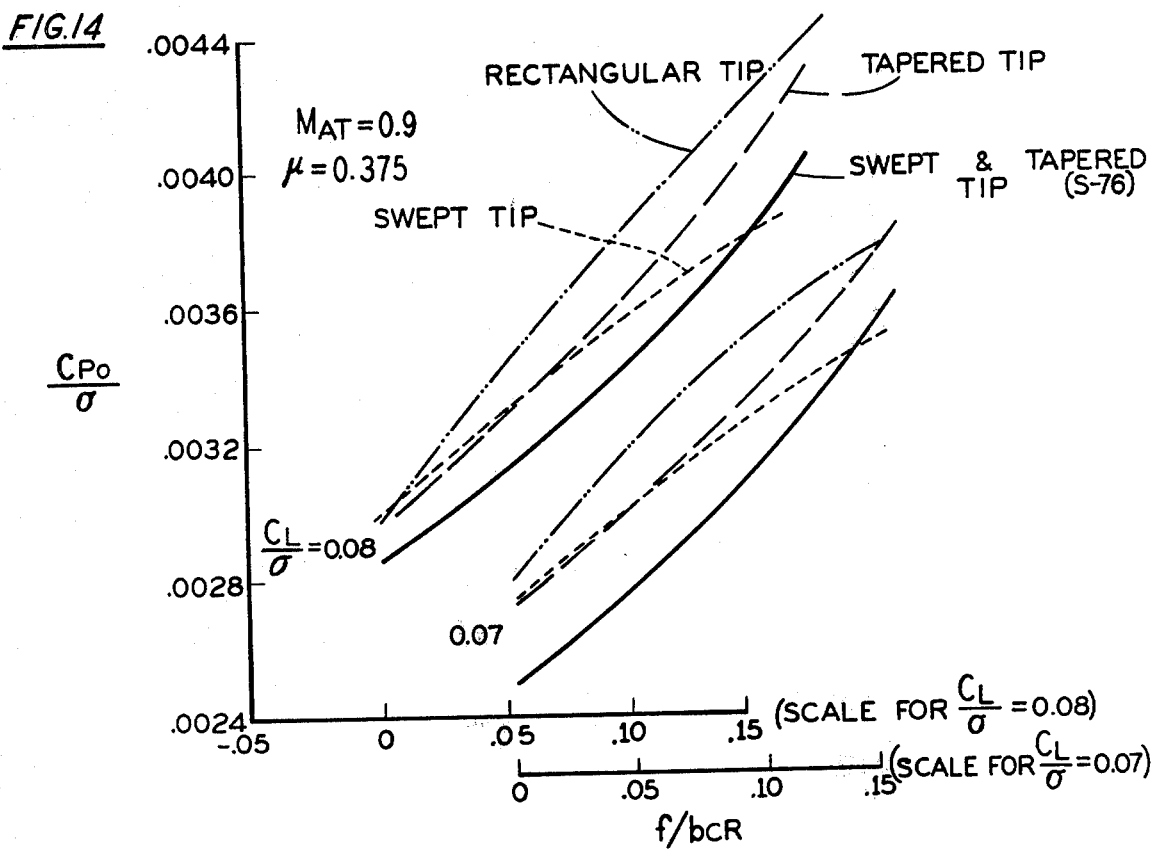
FIG. 14 is a graph of power coefficient solidity ratio v. the ratio of flat plate area-to-blade area for lift conditions $C_L \div \sigma = 0.07$ and 0.08, at high advancing tip Mach No. 0.9, and a high advance ratio of 0.375, with the plot staggered horizontally to avoid overlapping, to show the superiority of my blade tip over the others tested.
Figure 19A:
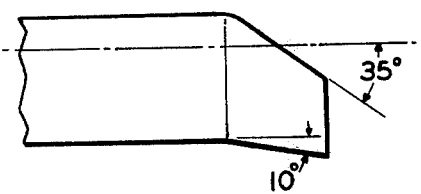
FIGS. 19A thru D are a showing for purposes of identification of the four blade tips which were tested with test results illustrated and discussed herein. These figures are added to give continuity to the description of these blade tips since the test reports referred to herein are not consistent in that regard.
Figure 19B:
Figure 19C:
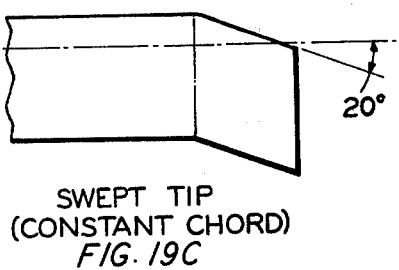
Figure 19D:
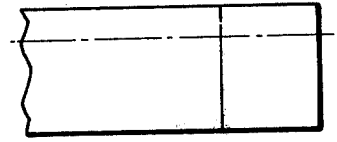
Figure 15:
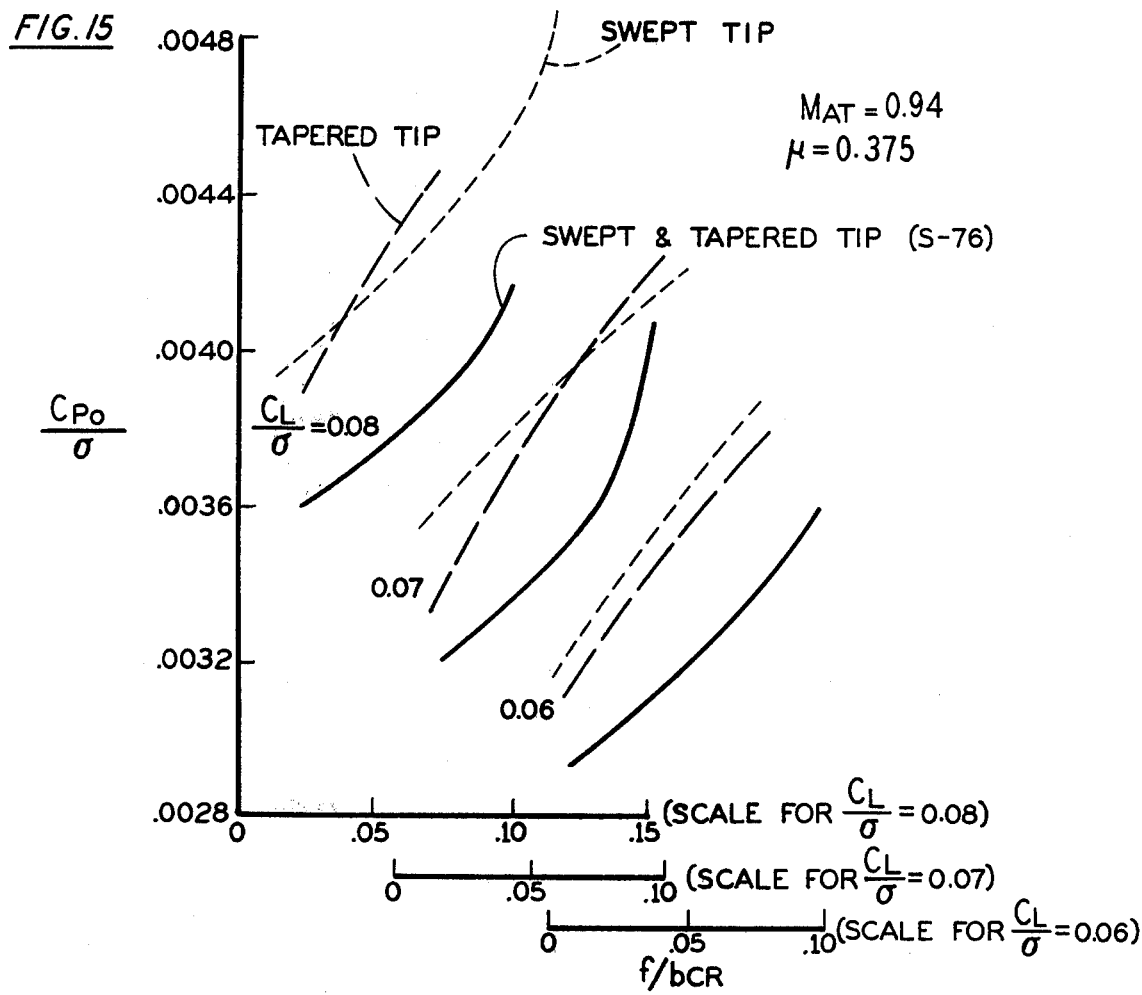
FIG. 15 is similar to FIG. 14 and illustrates test results at the advancing tip Mach No. 0.94.

The superior performance of my blade tip is further demonstrated by viewing FIGS. 14 and 15. FIGS. 14 and 15 are a plot of power v. rotor propulsive forces, that is, power co-efficient solidity ratio v. the ratio of flat blade area-to-area for the indicated lift conditions $C_L \div \sigma = 0.07$ and 0.08, high advancing tip Mach No. 0.9, and high advance ratio 0.375. These FIGS. show the superiority of my swept and tapered blade tip over the wide range of propulsive forces required, that is, whether the area frame is very clean or relatively dirty. Only at very high $f \div bcR$ values, beyond the range of interest for a modern commercial helicopter such as the S-76, is another tip slightly better. FIG. 15 shows an even greater benefit at a still more extreme Mach number of 0.94.

FIG. 16 is an accoustic comparison of the four blade tips at a high forward speed, high Mach number condition, where rotors usually produce the greatest noise. The FIG. 16 depicts time-histories which show instantaneous sound pressure level forward of and below the rotor so that it will correllate with the maximum noise level experienced by persons on the ground with a helicopter flying overhead. One rotor revolution is shown for each tip so that each time-history records the frequency of the four blades. The swept and tapered tip exhibits less overall noise and has more shallow "spikes", which means that the impulsive noise or "blade flap" previously exhibited by helicopters at high forward speed will be less for my swept and tapered tip as concluded on page 3 of the aforementioned Stroub report.

Figure 17:
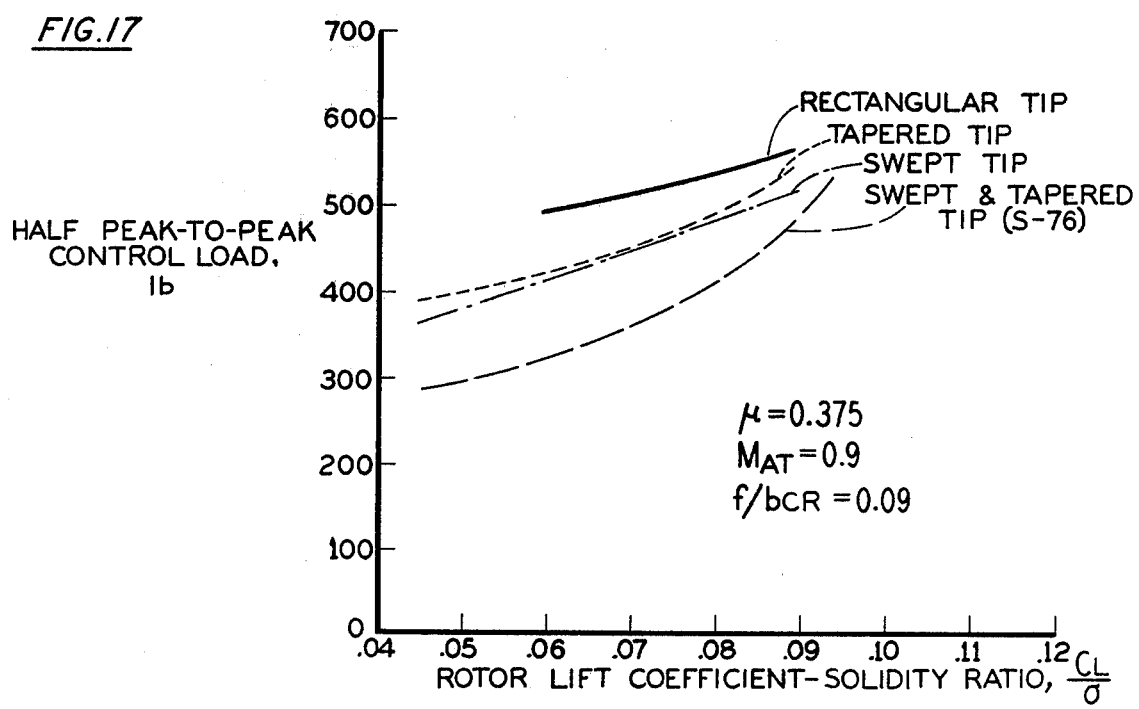
FIG. 17 is a graph of vibratory control loads preloaded as a function of rotor lift at high forward speed and high Mach number condition of the four blades under test.

FIG. 17 is a plot of the vibratory control load as a function of rotor lift at a high forward speed, high Mach number condition, namely, $\mu = 0.375$, M (advancing tip) = 0.09 and $f \div bcR = 0.09$. The vibratory control load is important because the rotor control system (swash plate, rotors, actuators, etc.) is generally sized by this fatigue consideration. FIG. 17 shows that my swept and tapered tip is superior to the other blade tips tested at these high Mach number conditions, which is a critical design requirement.

Figure 18:
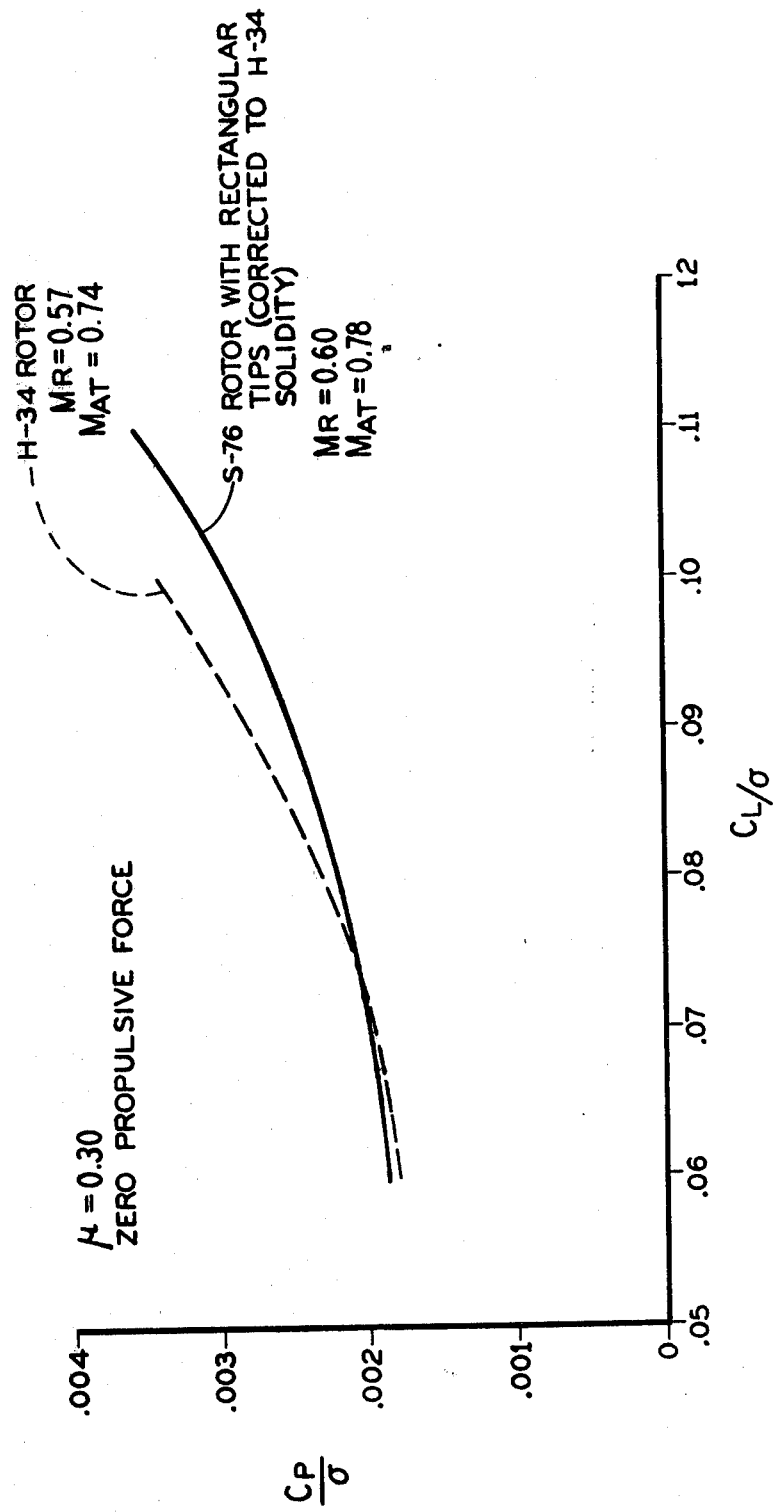
FIG. 18 is a graph illustrating the performance of my improved blade as compared to a conventional helicopter blade. The FIG. 18 coordinates are power coefficient-to-solidity ratio and lift coefficient-to-solidity ratio. The graph illustrates the superiority of the new blade over the older state-of-the-art practice even when the conventional rectangular tip shape is used on the new blade.

FIG. 18 is a plot of the particular helicopter blade taught herein against a conventional helicopter blade to show its superiority thereover. This is a plot of power coefficient-solidity ratio v. lift coefficient-solidity ratio for the same advance ratio condition (μ=0.30) and similar but not identical Mach numbers between a rotor with my blade with conventional tip and a conventional rotor. The comparison is between the highly successful standard production H-34 (Sikorsky S-58) main rotor having −8° twist and a symmetrical airfoil, and the S-76 main rotor fitted with the rectangular tips. The H-34 rotor was also tested in the NASA Ames 40-by-80 foot wind tunnel, as reported in the U.S. Army report USA AVLABS Technical Report 68-3, "An Experimental Study of the Performance and Structural Hoods of a Full-Scale Rotor at Extreme Operating Conditions" by Vincent M. Paglino and Andrew H. Hogan of Sikorsky Aircraft and published by U.S. Army Aviation Material Laboratories, Fort Eustis, Va., 1968. FIG. 14 is considered to present a valid comparison of the rotors tested because, except for the slightly different rotor speeds accepted compensation has been made to correct other test differences. To be specific, there were two other differences between the tests that required correction. First, the older, H-34 data did not include standard wind tunnel aerodynamic corrections to account for the interference effects caused by testing within closed walls rather than in free air, whereas the more recent S-76 tests included such corrections. Second, the solidity or ratio of total blade area-to-disk area is different for the two rotors, which influences rotor induced drag and power. The comparison shown in FIG. 14 did not alter the published H-34 data, but the wall interference correction of the S-76 was deleted and a solidity correction based on standard, accepted procedures was applied to the S-76 data to make it the same as the H-34.

The comparison shows that, despite higher Mach numbers, which are adverse to performance, the S-76 blade with rectangular tips had better performance than the older type H-34 rotor at typical CL/σ values of 0.08 to 0.10, with the power advantage increasing at higher lift values, and with higher lift values available, enhancing maneuverability as well as performance. This comparison shows that the superiority of the new blade is achieved partly from the airfoils and twist distribution selected and is not solely due to the geometry of the swept and tapered tip.

Another advantage of my helicopter blade construction is that test results reported in the aforementioned publications show that I have produced a blade of reduced blade noise. It should be borne in mind that blade noise is generated mainly at the advancing blade tip and our particular tip has been demonstrated to be the quietest of those tested as reported in the aforementioned publications.

I wish it to be understood that I do not desire to be limited to the exact details of construction shown and described, for obvious modifications will occur to a person skilled in the art.

I claim:

1. A cambered helicopter blade having:
   (A) a leading edge,
   (B) a trailing edge,
   (C) a tip portion,
   (D) a root portion adapted to be connected to the helicopter hub for rotation therewith, and
   (E) an airfoil shape central portion extending between said root and tip portions,
   (F) said tip portion being both swept and tapered, and
   (G) said blade being fabricated to have substantially −10° linear twist from approximately the 30 percent span station outwardly and reversing to non-linear positive twist inwardly thereof.

2. A helicopter blade according to claim 1 wherein said blade twist varies linearly from −2½° twist at the blade tip to +4.5° twist at approximately the blade 30 percent span station, then smoothly reduces to +2° twist inboard at the blade root portion.

3. The helicopter blade according to claim 2 wherein said tip portion leading edge is swept approximately 35° rearwardly of the central portion leading edge and is tapered so that the tip portion trailing edge is swept 10° with respect to the central portion trailing edge.

4. The helicopter blade according to claim 3 wherein said tip portion extends outwardly from approximately the 95 percent span station, has a taper ratio of about 0.6, and wherein the sweep of the tip portion quarter-chord axis is approximately 30° with respect to the central portion feathering and twist axes.

5. A helicopter blade according to claim 4 wherein the blade central portion is shaped to be of air-foil cross section SC1095-R8 at an inboard station thereof, and to be of airfoil cross section SC1095 at an outward station therein, and wherein said tip portion is of air-foil shape SC1095.

6. A helicopter blade according to claim 5 and including reflex tab means extending along the blade trailing edge at least at the span stations of said SC1095-R8 and SC1095 portions and defining an angle of about 3° deflected upwardly from the blade chord line.

7. A helicopter blade according to claim 6 wherein the trailing edge of said root portion is of elliptical shape throughout of at least a portion of its span.

8. A helicopter blade accordingly to claim 6 wherein airfoil cross section SC1095 is defined by the coordinate system:

| X/C | $Y_u/C$ | $Y_L/C$ |
|---|---|---|
| 0.00 | 0.00 | .00 |
| 0.0125 | 0.0177 | −.0145 |
| 0.025 | 0.0264 | −.0210 |
| 0.05 | 0.03677 | −.02843 |
| 0.075 | 0.04275 | −.03225 |
| 0.10 | 0.0468 | −.03460 |
| 0.15 | 0.0517 | −.0374 |
| 0.20 | 0.05447 | −.03883 |
| 0.25 | 0.0555 | −0.0394 |
| 0.30 | 0.05524 | −.03916 |
| 0.40 | 0.05299 | −.03761 |
| 0.50 | 0.04854 | −.03446 |
| 0.60 | 0.04212 | −.02988 |
| 0.70 | 0.03375 | −.02384 |
| 0.80 | 0.02362 | −.01658 |
| 0.90 | 0.01235 | −.00864 |
| 0.975 | 0.00328 | −.00232 |
| 1.0 | 0.00 | .00 |

Where X is the station along the blade chord, C is the blade chord dimension, Y is the location of the upper airfoil surface at station X, and $Y_L$ is the location of the lower airfoil surface at station X, and wherein the leading edge radius of the upper airfoil is 0.010 taken from a point on the blade chord and wherein the leading edge radius of the lower airfoil is 0.0066 taken from a point on the blade chord and within a range of ±3 percent of the given values of $Y_u/C$ and $Y_L/C$ so determined.

9. A helicopter blade according to claim 6 wherein airfoil cross section SC1095-R8 is defined by the coordinate system.

| UPPER SURFACE | | LOWER SURFACE | |
|---|---|---|---|
| $\frac{X}{C}$ | $\left(\frac{Y}{C}\right)_u$ | $\frac{X}{C}$ | $\left(\frac{Y}{C}\right)_L$ |
| 0.0 | 0.0 | 0.0 | 0.0 |
| .0125 | .0251149 | .0125 | −.0158497 |
| .025 | .0359152 | .025 | −.0187780 |
| .05 | .0495495 | .05 | −.0215250 |
| .075 | .0559500 | .075 | −.0227219 |
| .10 | .0602962 | .10 | −.0234926 |
| .15 | .0652657 | .15 | −.0245243 |
| .20 | .0673344 | .20 | −.0254468 |
| .25 | .0676587 | .25 | −.0263019 |
| .30 | .0668161 | .30 | −.0269408 |
| .40 | .0628376 | .40 | −.0270691 |
| .50 | .0568882 | .50 | −.0257689 |
| .60 | .0489283 | .60 | −.0230331 |
| .70 | .0388951 | .70 | −.0185521 |
| .80 | .0271559 | .80 | −.0130986 |
| .90 | .0140638 | .90 | −.0069779 |
| .975 | .00358462 | .975 | −.00185432 |
| 1.0 | 0.0 | 1.0 | 0.0 |

Where capital X is the station along the blade chord, C is the blade chord dimension, (Y/C)u is the location of the upper airfoil surface, and $(Y/C)_L$ is the location of the lower airfoil surface.

10. A cambered helicopter blade having:
(A) a leading edge,
(B) a trailing edge,
(C) a tip portion,
(D) a root portion adapted to be connected to the helicopter hub for rotation therewith, and
(E) an airfoil shape central portion extending between said root and tip portions,
(F) said tip portion being both swept and tapered,
(G) wherein said tip portion leading edge is swept approximately 35° rearwardly of the central portion leading edge and is tapered so that the tip portion trailing edge is swept 10° with respect to the central portion trailing edge wherein said tip portion extends outwardly from approximately the 95 percent span station, has a taper ratio of about 0.6, and wherein the sweep of the tip portion quarter-chord axis is approximately 30° with respect to the central portion feathering and twist axes, and
(H) said blade being fabricated to have substantially −10° linear twist from approximately the 30 percent span station outwardly and reversing to nonlinear positive twist inwardly thereof.

* * * * *